(12) United States Patent
Schnell et al.

(10) Patent No.: US 12,434,452 B2
(45) Date of Patent: Oct. 7, 2025

(54) RADIAL PRESS

(71) Applicant: Uniflex-Hydraulik GmbH, Karben (DE)

(72) Inventors: Alexander Schnell, Echzell (DE); Carsten Baumgartner, Laubach (DE)

(73) Assignee: UNIFLEX-HYDRAULIK GMBH, Kerben (DE)

( * ) Notice: Subject to any disclaimer, the term of this patent is extended or adjusted under 35 U.S.C. 154(b) by 406 days.

(21) Appl. No.: 18/129,475

(22) Filed: Mar. 31, 2023

(65) Prior Publication Data

US 2023/0234314 A1    Jul. 27, 2023

Related U.S. Application Data

(63) Continuation of application No. PCT/EP2021/077257, filed on Oct. 4, 2021.

(30) Foreign Application Priority Data

Oct. 2, 2020 (DE) ...................... 10 2020 125 890.9

(51) Int. Cl.
*B30B 7/04* (2006.01)
*B30B 3/00* (2006.01)
*B30B 15/02* (2006.01)

(52) U.S. Cl.
CPC ............... *B30B 7/04* (2013.01); *B30B 3/005* (2013.01); *B30B 15/026* (2013.01)

(58) Field of Classification Search
CPC .. B30B 1/40; B30B 7/04; B30B 15/04; B30B 15/0052
See application file for complete search history.

(56) References Cited

U.S. PATENT DOCUMENTS

| | | | |
|---|---|---|---|
| 5,323,697 A | 6/1994 | Schröck | |
| 6,361,305 B1 * | 3/2002 | Hinzpeter | B30B 11/08 425/193 |

(Continued)

FOREIGN PATENT DOCUMENTS

| | | |
|---|---|---|
| DE | 3513129 A1 | 10/1986 |
| DE | 4135465 A1 | 4/1993 |

(Continued)

OTHER PUBLICATIONS

International Search Report issued by the European Patent Office for International Patent Application No. PCT/EP2021/077257, mailed on Jan. 4, 2022.

*Primary Examiner* — Matthew Katcoff
(74) *Attorney, Agent, or Firm* — Myers Wolin, LLC

(57) ABSTRACT

A radial press is provided including a base, a hollow ring die mounted on the base rotatably relative to a press axis with an inner contour tapering in the direction of the axis and rotationally symmetrical, and a rolling element unit rotatable relative to the axis and having a pressure ring, which surrounds the axis, and a plurality of rolling elements arranged around the axis which are rotationally symmetrical. The rolling elements are supported on the pressure ring at a variable distance from the axis and can roll on the inner contour of the ring die. A rotary drive acts on the ring die or the rolling element unit and effects rotation about the axis. A feed drive also acts on the rolling element unit or the ring die and effects axial displacement of the rolling element unit and the ring die relative to each other.

27 Claims, 8 Drawing Sheets

(56) References Cited

U.S. PATENT DOCUMENTS

| | | | |
|---|---|---|---|
| 7,526,940 B2* | 5/2009 | Van Essen | B30B 7/04 |
| | | | 72/402 |
| 8,974,210 B2* | 3/2015 | Udink | B01J 2/20 |
| | | | 384/322 |
| 9,283,613 B2* | 3/2016 | Van Essen | B21D 39/046 |
| 2019/0039113 A1* | 2/2019 | Hejplik | B25B 27/10 |

FOREIGN PATENT DOCUMENTS

| | | |
|---|---|---|
| DE | 295 00 338 U1 | 2/1996 |
| DE | 19944141 C1 | 1/2001 |
| DE | 10149924 A1 | 4/2003 |
| DE | 20023234 U1 | 7/2003 |
| DE | 102005034260 B3 | 7/2006 |
| DE | 102005029681 A1 | 12/2006 |
| DE | 102005041487 A1 | 4/2007 |
| DE | 60121915 T2 | 8/2007 |
| DE | 19940744 B4 | 11/2008 |
| DE | 102009057726 A1 | 6/2011 |
| DE | 102011015654 A1 | 10/2012 |
| DE | 102011015770 A1 | 10/2012 |
| DE | 102014012485 B3 | 9/2015 |
| DE | 102014014585 B3 | 10/2015 |
| DE | 102014008613 A1 | 12/2015 |
| DE | 202016100660 U1 | 2/2016 |
| DE | 202016008097 U1 | 2/2017 |
| DE | 102016106650 A1 | 10/2017 |
| EP | 0 916 426 B1 | 5/1999 |

* cited by examiner

RADIAL PRESS

CROSS REFERENCE TO RELATED APPLICATIONS

This application is a continuation under 35 U.S.C. § 120 of International Application PCT/EP2021/077257, filed Oct. 4, 2021, which claims priority to German Application No. 10 2020 125 890.9, filed Oct. 2, 2020, the contents of each of which are incorporated by reference herein.

FIELD OF THE INVENTION

The present invention relates to a radial press, i.e. a press used for radial deformation—relative to a press axis—of a workpiece while reducing its radial dimensions.

BACKGROUND

Typical workpieces subjected to radial forming by means of such a radial press are the connecting fittings attached to the piece of hose at the end of a hydraulic hose line. In these, a sleeve surrounding the hose is pressed radially inward in the direction of a "nipple" inserted into the hose, so that the hose is clamped firmly between nipple and sleeve and thus is secured against being pulled out of the fitting. Other typical subassemblies having structural parts joined by means of radial pressing are armature elements, heavy current insulators, etc. Likewise practical applications of radial presses of the type in question here relate to operations of radial forming of workpieces that take place outside joining processes.

Radial presses suitable for radially pressed articles of the type explained in the foregoing are known in various concepts and diverse configurations. Examples are disclosed in DE 20 2016 100 660 U1, DE 20 2016 008 097 U1, DE 10 2016 106 650 A1, DE 10 2014 014 585 B3, DE 10 2014 012 485 B3, DE 10 2014 008 613 A1, DE 10 2011 015 770 A1, DE 10 2011 015 654 A1, DE 10 2009 057 726 A1, DE 10 2005 041 487 A1, DE 10 2005 034 260 B3, DE 601 21 915 T2, DE 298 24 688 U1, DE 199 44 141 CI, DE 199 40 744 B4, DE 101 49 924 A1, DE 41 35 465 A1 and DE 35 13 129 A1. Regardless of their respective design and other technical features, the known radial presses are alike in that a plurality of press members of approximately wedge-shaped cross-section—eight press members are most common—disposed in a manner distributed uniformly around the press axis are moved uniformly (and typically simultaneously) radially in the direction of the press axis by means of a (typically hydraulic) drive. Radially inwardly, these press members have a pressing face (e.g. shaped concavely, as a segment of a circular cylinder), which is in contact with the workpiece during forming; this geometry of the pressing face regularly corresponds substantially to a segment (e.g. one eighth) of the target geometry of the workpiece after forming. In this respect, it is to be noted that the radial presses in question here are suitable for radial forming of workpieces having the most diverse geometries, ranging from (idealized) circular cylindrical workpieces through other strictly rotationally symmetrical workpieces (i.e. workpieces having—perpendicular to a workpiece axis—circular cross-sections of different radii) to workpieces with non-round, e.g. polygonal cross-sections.

A press machine used for radial pressing of press fittings onto pipe ends and operating according to a different technical concept can be found in DE 295 00 338 U1. It comprises a split press ring, which can be closed around the press fitting and is provided with pressing elements, which are disposed in distributed manner along the inner circumference, which can be moved radially inwardly by means of a positioning device and which are constructed as rotatable press rolls. A comparable functional and construction principle underlies the pressing apparatus according to DE 200 23 234 U1. According to EP 0 916 426 B1, this concept is implemented for shaping an end part of an otherwise cylindrical workpiece, such as, for example, a metal housing, wherein the end part is off-centered relative to the cylindrical region of the workpiece and is reduced in diameter.

The known radial presses of the Applicant (see also www.uniflex.de), which are constructed according to the prior art cited hereinabove, have proved entirely successful in practice. They can be used to manufacture, reliably and highly reproducibly, radially pressed articles that meet even the most stringent requirements. For certain application situations, however, radial presses would be desirable with which forming tasks comparable to those of conventional radial presses according to the prior art can be achieved, albeit with a less powerful drive unit. One of the background reasons for this is the need for radial pressing operations performed in cleanrooms. In particular, radial presses with purely electric press drives are more suitable for this purpose than such with electrohydraulic press drives, although purely electric drives cannot attain the high power density of electrohydraulic drives.

SUMMARY

The foregoing problem is solved according to embodiments of the present invention by the radial presses described herein. Accordingly, the radial press is characterized in that it comprises a base, a hollow annular die mounted rotatably thereon relative to a press axis and having an inner contour that tapers in the direction of the press axis and is rotationally symmetrical relative to the press axis, and a rolling-element unit capable of rotating relative to the press axis and having a thrust ring surrounding the press axis and a plurality of rotationally symmetric rolling elements, which are disposed around the press axis and taper at least in regions, which are rotatably axially braced on the thrust ring with variable distance to the press axis, and which can roll along the inner contour of the annular die, wherein a rotary drive acts on the annular die and/or the rolling-element unit, causing their rotation around the press axis, and wherein furthermore a feed drive acts on the rolling-element unit and/or on the annular die, causing axial adjustment of the rolling-element unit and of the annular die relative to one another along the press axis. The positioning of the rolling elements in the sense of a decrease of the pressed size—which will be understood as the radial dimension of the workpiece resulting from radial forming, especially the workpiece diameter—then takes place via an axial adjustment of the rolling-element unit relative to the annular die by means of the feed drive.

In this way, the present disclosure completely departs from the concept embodied by all established radial presses, which is characterized (see hereinabove) by radially moved press members, which respectively bear continuously on the workpiece with a (typically concave) pressing face during radial forming; in the process, relatively stationary contact typically exists between press members and workpiece. Instead of this, according to embodiments of the invention, radial forming takes place via rolling elements, which roll on the surface of the workpiece as well as along the inner contour of an annular die, wherein the radial positioning of the rolling elements—for progressive decrease of the pressed size—takes place by an axial displacement of the rolling-element unit relative to the annular die, the inner contour of which tapers along the press axis. In embodiments of the inventive radial press, the rolling elements that bring about forming of the workpiece and that taper at least in some regions—the orientation of this taper of the rolling elements is the same relative to the press axis as that of the taper of the inner contour of the annular die—do not bear on the workpiece to be formed over a relatively large area, as is the case of conventional press members with their concave pressing faces, but instead are in contact with the workpiece only over relatively small areas, typically approaching line contact. The geometry of these contact areas can be influenced especially by the geometry of the rolling elements, as will be shown in more detail hereinafter, so that, to be specific, not only rectangular but also, for example, trapezoidal contact areas can be realized. In contrast what applies for conventional radial presses (see hereinabove), the contact areas of the rolling elements "wander" on the surface of the workpiece; thus, in implementation of the invention, what takes place is not radial pressing in a discrete number of planes (e.g. four planes in the case of 8-jaw radial presses), but instead circumferential radial forming. In this way, the pressure required for forming of the workpiece can be provided with significantly lower acting forces than in the case of established radial presses.

This in turn permits the use of substantially less powerful radial press drives for execution of specified radial press tasks than in the case of conventional radial presses. For example, as a result of this, diverse typical radial press forming operations may be carried out with embodiments of inventive radial presses, in which the rotary drive causing rotation of the annular die and/or of the rolling-element unit around the press axis as well as the feed drive causing the axial adjustment of the rolling-element unit and of the annular die relative to one another along the press axis are constructed as relatively compact purely electric drives. At least in the case of such direct use of electric drives, improved operating ratios and very good energy efficiency can also be achieved as a result of the absence of energy conversion from mechanical to hydraulic energy and thus of the associated conversion losses.

A significant further advantage of embodiments of the present invention may consist in the individual case in the possibility of radially forming workpieces in such a way that they are ideally strictly rotationally symmetrical at the end of radial forming, in that they have—in the case of an ideally circular cylindrical geometry—an ideally circular cross section (or—in the case of a different strictly rotationally symmetrical geometry—different ideally circular cross sections). This is usually not possible with conventional radial presses, because ridges—due to outwardly displaced material—may be formed between respectively two adjacent press members during the pressing process, and may include even more or less pronounced "tunnels". In the extreme case, such nonuniformity may even favor the formation of cracks or the development of other damage. Embodiments of the inventive radial press may prove to be superior to the prior art in this respect also.

It will be noted that, during application of embodiments of the inventive radial presses, the radial forming of the workpiece may also be limited if necessary to individual regions of the workpiece surface that are spaced apart from one another in circumferential direction. In this case, the rolling elements roll not on the entire circumference of the workpiece, but instead only on partial regions—if necessary in oscillating manner. Thus embodiments of the inventive radial press can be used specifically for the manufacture of non-round workpieces. The same applies if, during the circulation of the rolling elements, their positioning increases and decreases rhythmically as a result of a corresponding rhythmic relative axial movement between annular die and rolling-element unit.

The statement that the rolling elements are tapered at least in some regions implies that a tapering geometry of the rolling elements does not necessarily have to extend over their entire axial length. To the contrary, it is also conceivable, for example, that the rolling elements are cylindrically constructed over part of their axial length or if necessary even become wider, as is the case for rolling elements having a (symmetrically or asymmetrically) convex or barrel-shaped geometry. What is decisive is that the rolling elements are in rolling contact with the tapering—in the same direction—inner contour of the annular die precisely in every tapering region. Incidentally, it is evident from the foregoing that, within the scope of the present invention, the inner contour of the annular die does not in any way have to taper over its entire axial extent; to the contrary, tapering over part of the axial length is sufficient, wherein this tapering region is available for rolling contact of the rolling elements. Thus the statement that the annular die has an inner contour tapering in the direction of the press axis and being rotationally symmetrical relative to the press axis will ultimately be understood to the effect that the annular die is configured in this very way, at least in some regions.

By way of precaution, in order to avoid misconceptions, it is to be pointed out that the statement that the rolling elements "roll" on the inner contour of the annular die should not be interpreted—in the sense of perfect rolling—to the effect that no relative movement of any kind of the surfaces of the rolling elements and annular die relative to one another exists in the region of contact between the respective rolling element and the inner contour of the annular die. To the contrary, such a relative movement (in circumferential direction) is entirely possible, at least to a locally limited extent (see below). Furthermore, likewise to avoid misconceptions, it is to be pointed out that a rotary drive acting on the rolling-element unit and causing its rotation around the press axis may also be constructed—alternatively or in addition to a rotary drive of the thrust ring—in the form of a drive that primarily sets the individual rolling elements (or at least some of them) in rotation, wherein the rolling elements roll on the workpiece as a result of the self-rotation forced upon them thereby. If the workpiece is held co-rotatably, as is the case for diverse typical radial press applications, the thrust ring of the rolling-element unit as well as the annular die are set in rotation relative to the press axis by the rolling elements rolling on the workpiece as well as on the inner contour of the annular die. However, if rotation of the workpiece comes into question, the thrust ring may co-rotate with the rolling-element unit or else with the annular die, depending on individual configuration of the radial press.

By way of precaution, it is also to be pointed out explicitly that, during application of embodiments of inventive radial presses, it is also possible to manufacture workpieces in which local necking or comparable surface depressions are provided. For this purpose, the rolling elements—in the direction of their axis—may be constructed to be correspondingly short and/or may be profiled or may have a non-tapering geometry. Even surface structuring of the workpiece is feasible—by corresponding structuring of the rolling elements; in this sense, the rolling elements may have, for example, small surface depressions, whereby corresponding surface elevations (e.g. nubs) are formed on the workpiece.

According to a first preferred further development of the invention, the rolling elements and also the inner contour of the annular die have a substantially frustoconical basic shape, wherein "substantially" indicates that the geometry is not that of a mathematically exact truncated cone. For example, even rolling elements approximating a truncated cone but nevertheless having a slightly convex or concave surface not only are possible within the scope of this further development, but in the individual case are even very advantageous. According to an exemplary advantageous configuration of such a "substantially frustoconical basic shape" of the rolling element, its "cone angle" changes continuously over its extent along its own axis. Particularly preferably, twice the cone angle of the rolling elements—which have a substantially frustoconical basic shape—then corresponds substantially to half the cone angle of the annular die. Such a configuration of the radial press is particularly predestined for pressing of workpieces with a completely or at least approximately circular cylindrical surface, wherein the dimensions of the radial press may then be relatively small. Incidentally, even such rolling elements that are strictly frustoconical over an extended part of their length but nevertheless deviate from this in subordinate regions (e.g. adjacent to one end or both ends), for example by being rounded, cylindrical, chamfered, or the like, are to be regarded as rolling elements having a frustoconical basic shape. The same applies if the rolling elements are profiled differently not at the ends of a truncated cone but instead at any arbitrary position between the ends; in this sense, the rolling elements may have, for example, (at least) one circumferential notch, whereby, during radial forming of the workpiece, (at least) one corresponding circumferential rib is formed thereon. Within the scope of the substantially frustoconical basic shape of the rolling elements and of the inner contour of the annular die, diverse configurations that are different in detail are therefore entirely possible and prove to be advantageous for various situations of application of the radial press.

Thus, according to a first particularly preferred configuration, the inner contour of the annular die and the rolling elements may be constructed as geometrically exactly frustoconical. In this way, a precise and clearly defined position of the rolling elements is obtained, with the consequence of a particularly high reproducibility of forming. However, a movement—more or less pronounced depending on the individual geometric conditions—of the surface of the rolling elements relative to the workpiece and to the annular die is unavoidable; a pure rolling movement of the rolling elements on the surface of the workpiece and on the inner face of the annular die cannot be achieved.

In order to be able to reduce the "rubbing" in question and adverse effects associated therewith, the rolling elements may—according to another particularly preferred configuration—be made slightly convex, with a construction of the inner contour of the annular die that if necessary is again geometrically exactly frustoconical. In this way, the pressing pressure of the rolling elements on workpiece and annular die is not homogeneous over their axial extent; to the contrary, it has a maximum more or less at half length of the rolling elements and decreases toward their two ends. This proves to be advantageous, especially even in such combinations of circumstances in which, during forming—with successively decreasing press diameter—the workpiece is moved axially (forward and back several times, if necessary) relative to the rolling elements, so that the region of the instantaneous forming "wanders" (forward and back, if necessary) on the workpiece, in order to gradually cover the entire forming region of the workpiece. In this situation, a slightly convex construction of the rolling elements may be conducive to the axial movement of rolling elements and workpiece relative to one another. However, even in such combinations of circumstances in which the rolling elements encompass the entire forming region of the workpiece without such an axial movement of workpiece and rolling-element unit relative to one another, a slightly convex construction of the rolling elements may be advantageous, namely in order to generate, in the workpiece, a stress distribution with stresses decreasing towards the borders of the forming region, thus possibly affecting the useful life of the workpiece positively. The possibility of influencing the shape of the contact face between rolling elements and workpiece via the geometry of the rolling elements—in relation to the geometry of the workpiece to be formed—can also be used to the effect that—for avoidance of local load peaks—a substantially rectangular contact area is obtained.

According to yet another particularly preferred configuration, the aforesaid "rubbing" or possible adverse effects thereof can also be reduced in that—in a construction of the rolling elements that if necessary is again geometrically exactly frustoconical—the inner face of the annular die is slightly concave in the manner of a waist, i.e. is slightly inwardly curved in the direction of the axis compared to an exact conical surface. An inhomogeneous distribution of the pressing pressure of the rolling elements (over their axial extent) on the annular die is also obtained in this way. The axial adjustment of the rolling-element unit relative to the annular die for the purpose of positioning the rolling elements in the radial direction is expressed in this case in a more or less pronounced change—depending on the degree of curvature of the inner face of the annular die—in the angle of attack of the rolling element axes relative to the press axis and therefore in a change in the geometry of the forming region defined by the entirety of the rolling elements (e.g. by a transition from slightly conical to circular cylindrical). This can be exploited for a specific influence on the course of radial pressing, for example by specific gradual shifting of the instantaneous region of workpiece forming during a complete radial pressing process.

As far as the annular die is concerned, it may be constructed in one piece. However, a particularly preferred configuration of the invention is characterized by a multi-part construction of the annular die in such a way that it comprises a support ring and an insert, which is interchangeably received therein and defines the inner contour. With such a construction, several particularly practical advantages can be achieved at the same time. In the event of wear (see the possible "rubbing" of the rolling elements discussed hereinabove), reconstruction or reconditioning of the radial press is therefore possible with minimum material and time expense. This advantage can already be achieved by an exchangeable, e.g. more or less funnel-shaped, sliding bearing plate constructed as a deep-drawn part, wherein a construction of the inner face of the annular die with grooves, bores or the like (see below) is particularly simply feasible in this case.

In addition, in the case of a suitable multi-part construction of the annular die, the radial press can be adapted to different pressing tasks (e.g. different initial and/or final diameters of the workpiece) with very little effort by replacing the one insert with a different insert having a different inner geometry, so that the full radial positioning of the rolling elements—provided by the axial displaceability of annular die and rolling-element unit relative to one another—is available for effective radial deformation of the workpiece.

A device that may be provided and used for holding the workpiece during radial pressing is expediently mounted on the base of the radial press. If axial wandering of the rolling elements on the workpiece has to take place (possibly several times) during radial pressing (see hereinabove), this holding device permits axial displacement of the held workpiece relative to the base to a predetermined extent, for which purpose two stops (adjustable if necessary) are expediently provided.

According to another preferred further development of the invention, the rolling elements are mounted with the ability to rotate on bearing pieces, which are displaceably guided along the thrust ring—preferably in undercut guides of the thrust ring in such a manner that they cannot be lifted out—on sliding faces. Particularly preferably, these said sliding faces are constructed on the surface of exchangeable sliding bearing plates. In this way, uniformly low-friction positioning of the rolling elements may be ensured with minimum effort—by exchange of the sliding bearing plates—thus resulting in optimum operating behavior of the radial press in terms of high quality of radial pressing with good reproducibility of radial forming. The sliding faces—which may be constructed in planar or more or less curved manner—may extend perpendicular to the press axis. It is quite particularly advantageous, however, if the sliding faces are inclined relative to the press axis, and specifically in the direction opposite the tapering of the inner contour of the annular die, albeit in a manner ideally considerably steeper than the latter. Thus, for example, with a half cone angle of the substantially frustoconical inner contour of the annular die of between 10° and 20°, the angle of attack of the sliding faces relative to the press axis may be between 80° and 85°. Within the scope of one configuration of the invention having particularly low-friction positioning of the rolling elements, it is also possible to use hydrodynamic bearings for the bearing pieces on the thrust ring. Such "wet" bearing of the bearing pieces on a pressurized fluid cushion comes into consideration in particular if "wet" radial forming of the workpiece also takes place, i.e. a radial pressing operation that is executed while pressurizing the forming zone with (lubricating and/or cooling) fluid.

Precisely in regard to such forces, which (due to the local rubbing of the surfaces of the rolling elements on the inner contour of the annular die, as explained hereinabove) are able to act in circumferential direction on the rolling elements, it proves to be advantageous if—according to another preferred further development of the invention—the thrust ring is part of a rolling-element cage, which is provided with a wall having openings, in which the rolling elements are rotatably mounted at their two ends. For the purpose of positioning the rolling elements, the two rotary bearings at the end of each rolling element respectively comprise a bearing piece, which is displaceably guided on a sliding face, in an associated guide of the rolling-element cage.

Yet another preferred further development of the invention is characterized in that the base is constructed in the form of a housing, wherein a shell portion of the base surrounds the annular die at least partly. This housing-like base likewise offers protection for the rotating parts of the radial press and also minimizes the risk of injury to the operator. Ideally, the housing-like base is closed so extensively or so comprehensively (possibly by means of a cover or the like) that all rotating parts are completely enclosed or at least covered. Parts of the radial press protruding from the housing-like base (such as, in particular, components of the feed drive) are ideally mounted to co-rotate/in a manner secured against rotation. Thus, according to a preferred configuration, the feed drive may comprise, in a manner coaxial with the press axis, a thrust tube, which acts via an axial bearing on the thrust ring and on the base is guided displaceably along the press axis via a co-rotatable linear guide. If necessary, the workpiece can be introduced through the thrust tube into the machining space between the rolling elements. According to a preferred further development of the invention, an alternative or additional accessibility to the machining space in order to charge it with a workpiece consists in the fact that the base has, adjacent to the end of the annular die associated with the smaller diameter of the inner contour, an opening extending around the press axis. The charging of the machining space with a workpiece through just such an opening is particularly advantageous in the individual case, even from the viewpoint of quality of the formed product. Accessibility to the machining space from both sides may be associated with particularly pronounced advantages if the radial press is part of an automated production line, because a workpiece throughput with workpiece charging from one side and workpiece discharge to the other side of the radial press is very advantageous from viewpoints of process efficiency.

According to yet another preferred further development of the invention, an odd number of rolling elements is provided, so that two rolling elements are not diametrically opposed to one another. This proves to be very advantageous with regard to the quality of radial pressing, since in this way the risk of undefined operating and load conditions is significantly reduced. Against the same background, it is favorable if the rolling-element unit has preloading springs, which preload the rolling elements outwardly for bearing on the annular die. For typical application situations, three, five or seven rolling elements prove to be very favorable, wherein five rolling elements are preferably provided; and the mean (outer) diameter of the rolling elements is preferably between 15% and 30%, particularly preferably between 20% and 25%, of the mean (inner) diameter of the annular die.

For various application situations, it is advantageous if the surface of the rolling elements is more or less ideally smooth, e.g. polished. However, this is in no way always the case. To the contrary, yet another preferred further development of the invention is characterized in that the surface of the rolling elements is profiled. Thus, for radial forming of workpieces consisting of certain materials, it may be advantageous if the rolling elements have a nub-like profiling, which ensures more or less pinpoint concentration of the pressing forces, wherein leveling takes place by rolling over the surface of the workpiece several times. Other profilings may likewise have a positive effect in the individual case. A helical profiling of the rolling elements may prove favorable for facilitated positioning of the rolling elements in the course of the radial forming process. It is also possible to reduce the axial counterholding forces on the workpiece by specific roughening of the rolling element surfaces. And annularly closed micro-serration extending over the respective circumference of the rolling element in question is conducive to frictional connection between rolling element and annular die and in this way prevents blocking of the rolling elements (when the rotary drive is acting on the annular die).

As far as the surface of the inner contour of the annular die is concerned, an at least approximately ideally smooth (e.g. polished) finish is favorable for diverse common applications. However, deviating configurations may also prove advantageous here. A particularly preferred further development in this respect is characterized in that the inner contour of the annular die is grooved, especially in that it has a helically constructed groove—or at least one. In this case, abrasion, soiling, etc. along the groove may be removed from the running zone of the rolling elements without hereby impairing smooth running of the rolling elements, wherein the groove in question may also be connected in particular to an exhaust system for this purpose. The removal of abrasion, soiling and the like not only increases the dimensional accuracy and also other manufacturing quality of the workpieces; it also acts positively on the useful life of the radial press. According to an alternative preferred configuration of the invention, perforation of the inner contour of the annular die may also prove advantageous in the foregoing respect, wherein the perforations in question are particularly preferably connected to an exhaust system in this case also. This can be implemented particularly effectively in a radial press in which the annular die (as explained hereinabove) is constructed in several parts with a support ring and an insert, which is received exchangeably therein and defines the inner contour. By means of a suitable annular cavity between support ring and insert, it is possible to "back-ventilate" the latter, while bores made in the insert are connected to the annular cavity in question for the removal of abraded material or soiling. Even the introduction of local depressions (comparable to dents) in the surface of the inner contour of the annular die may be advantageous. After all, dirt is able to settle there and be removed by means of regular cleaning.

Within the scope of the present invention, several variants come into consideration for realization of the rotary drive, which causes the rolling of the rolling elements on the—non-rotating—workpiece. Considering structural aspects, it proves particularly advantageous if the rotary drive acts exclusively on the annular die. In this case, the rolling-element unit is entrained (in a manner comparable to the situation in a planetary gear) at correspondingly reduced rpm. However, it is also conceivable that the rotary drive acts exclusively on the rolling-element unit (i.e. the thrust ring and/or the rolling elements), wherein, in this case (again comparable to the situation in a planetary gear), the annular die is entrained at a correspondingly increased rpm. In addition, allowing the rotary drive to act both on the rolling-element unit and on the annular die comes into consideration. By influencing the direction of rotation and rpm of the two components by means of an appropriate control system, it is also possible in this case to influence a possible rotation of the workpiece. Although this is the exception in typical application situations, it may be advantageous in the individual case. If the rotary drive acts exclusively or else at least also on the annular die, it is particularly advantageous from static viewpoints and thus from aspects of manufacturing precision if the bearing of the annular die on the base comprises two spatially separated bearing units, wherein the point of application of the rotary drive on the annular die is located between the two bearing units.

Within the scope of the present invention, several variants also come into consideration as regards the realization of the feed drive. Considering structural aspects, it proves to be particularly advantageous if the feed drive acts exclusively on the rolling-element unit, wherein the annular die is secured axially relative to the base. In the individual case, however, an inverted arrangement may also prove to be advantageous, in that the feed drive acts exclusively on the annular die, wherein, in this case, the rolling-element unit is secured axially relative to the base. Finally, a configuration is also conceivable to the effect that both the rolling-element unit and the annular die are axially displaceable relative to the base, wherein the feed drive acts both on the rolling-element unit and the annular die.

According to a modification of the invention explained in the foregoing, it is possible to use rolling elements that are substantially cylindrical or that widen at least in some regions instead of rolling elements that taper at least in some regions. A radial press constructed in such a way is suitable for the manufacture of radially formed workpieces that are to be given not a cylindrical but to the contrary a conical geometry in the radial forming zone. This is explained in more detail in the description of the figures (see the explanations of FIGS. 4 and 5). The same applies to a further modification of the invention explained in the foregoing, to the effect that the annular die does not rotate relative to the base but to the contrary co-rotates therewith. For these two modifications of the invention also compared to the basic concept explained hereinabove, diverse of the preferred configurations described in more detail herein prove to be favorable.

In yet a further modified form, the concept underlying the invention in the scope explained in the foregoing can be implemented with comparable advantages (see FIG. 5) to the effect that the inner contour of the annular die—again tapering in the direction of the press axis—is not rotationally symmetrical, but to the contrary has a plurality, disposed uniformly around the press axis and inclined relative to the press axis, of pocket-shaped receptacles for the rolling elements, wherein the rolling elements for their part roll not on the inner contour of the annular die, but to the contrary are respectively mounted rotatably around their own axis and in slidingly displaceable manner in the associated pocket-shaped receptacle, along the axis of the latter. A fluidic bearing proves to be advantageous here. In particular, these pocket-shaped receptacles may have a partly cylindrical surface, with a cylinder axis inclined relative to the press axis. These cylinder axes intersect one another at a common point of intersection located on the press axis. In this case also, the rolling elements may be constructed in tapering manner at least in some regions. However, this is not obligatory. Thus they may also be constructed cylindrically, for example, which is useful in particular when the workpiece is intended to take on not a cylindrical but to the contrary a conical geometry in the radial forming zone. For this modification of the invention also compared to the basic concept explained hereinabove, diverse of the preferred configurations described in more detail and specified herein prove to be favorable. Expressed independently and positively (i.e. not as a modification of the definition of the invention), the realization in question explained in the foregoing for the invention can be defined as a radial press comprising a base, a hollow annular die rotatably thereon in a manner capable of rotating relative to a press axis, with an inner contour tapering in the direction of the press axis and constructed to be non-rotationally symmetrical and, disposed uniformly around the press axis and inclined relative to the press axis, provided with a plurality of pocket-shaped receptacles for rolling elements, and a rolling-element unit, which is rotatable relative to the press axis and has a thrust ring surrounding the press axis and a plurality of rotationally symmetrical rolling elements, which are disposed around the press axis, if necessary are constructed in tapering manner, at least in some regions, and are respectively braced axially with the ability to rotate on the thrust ring with variable distance to the press axis and are mounted rotatably around their own axis and in slidingly displaceable manner in the associated pocket-shaped receptacle, along the axis of the latter, wherein a rotary drive acts on the annular die and/or on the rolling-element unit, causing their rotation around the press axis, and wherein furthermore a feed drive acts on the rolling-element unit and/or the annular die, causing axial adjustment of the rolling-element unit and of the annular die relative to one another along the press axis.

BRIEF DESCRIPTION OF THE DRAWING

The present invention will be explained in more detail hereinafter on the basis of several exemplary embodiments, illustrated in the drawing, wherein.

DETAILED DESCRIPTION OF THE PREFERRED EMBODIMENTS

Figure 1:
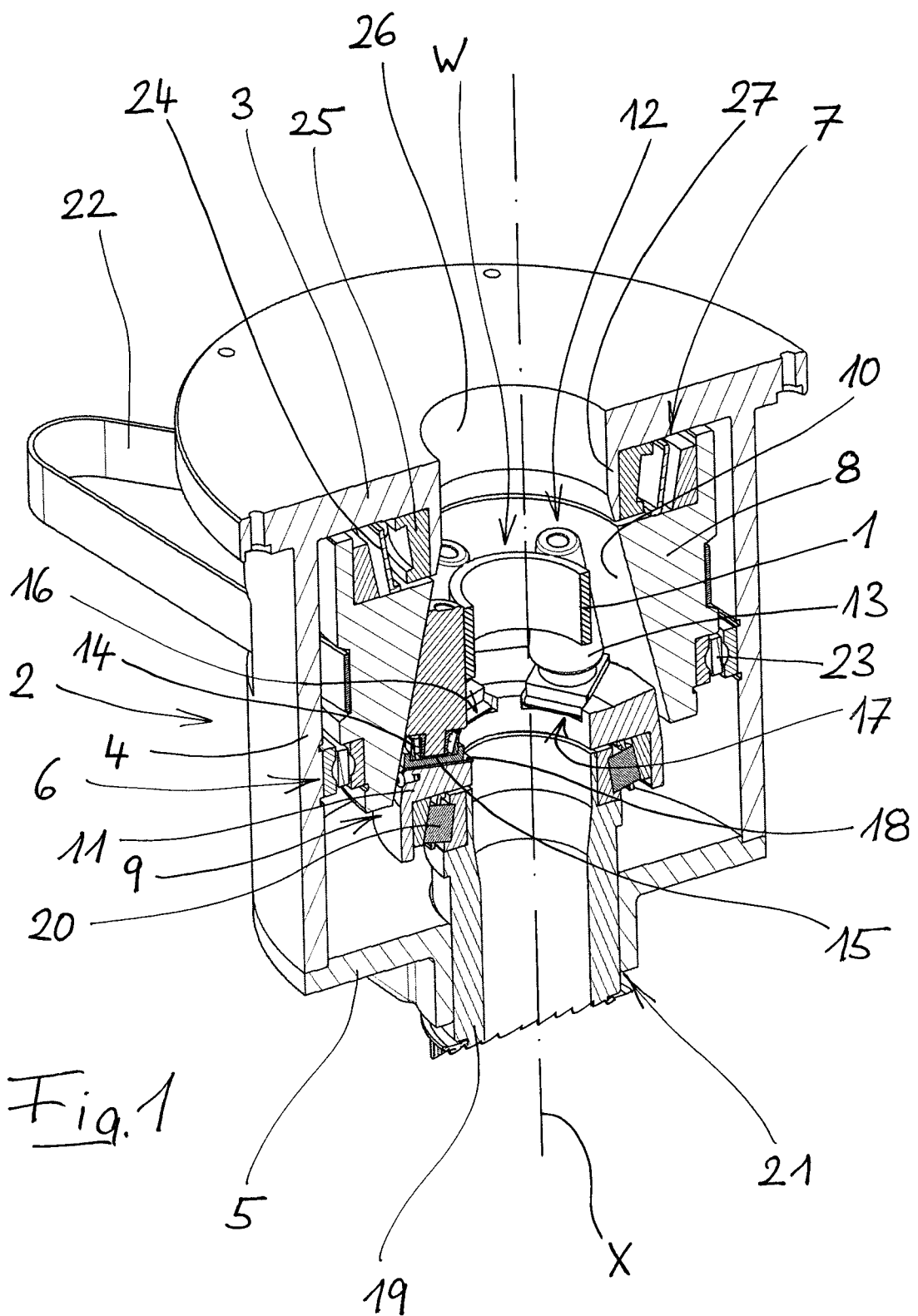
FIG. 1 shows, in perspective view, an axial section through a first inventive radial press

The radial press presented in FIG. 1 of the drawing and used for radial forming of a workpiece W—illustrated, for example, by a ring 1—comprises as main components a base 2 constructed in housing-like manner with a bottom 3, a shell portion 4 and a cover 5, a hollow annular die 8 mounted on base 2 and capable of rotating relative to a press axis X by means of a first rolling bearing 6 and a second rolling bearing 7, as well as a rolling-element unit 9 capable of rotating relative to press axis X. This annular die 8 has a rotationally symmetrical inner contour 10 of frustoconical geometry (half cone angle approx. 15°), tapering in the direction of press axis X. And rolling-element unit 9 comprises a thrust ring 11 surrounding press axis X and five frustoconically shaped rolling elements 12 (rolling cones 13 with double cone angle of approximately 15°) disposed around press axis X and capable of rolling on inner contour 10 of annular die 8.

These rolling cones 13 are braced rotatably on thrust ring 11, specifically with variable distance relative to press axis X. For this purpose, each of the rolling cones 13 is rotatably mounted by means of an associated bearing 14 on a bearing piece 15, which in turn is displaceably guided on thrust ring 11 on a sliding face 16. These sliding faces 16—disposed at the bottom of guides 17 laterally embracing bearing pieces 15 and inclined relative to press axis X—are constructed on the surface of exchangeable U-shaped sliding bearing plates 18.

A feed drive acts on rolling-element unit 9, causing its axial adjustment along press axis X. This comprises, coaxial with press axis X, a thrust tube 19, on which thrust ring 11 is braced via a tapered roller bearing 20 and which, on cover 5 of base 2, is guided displaceably (but in co-rotatable manner) along press axis X via a linear guide 21. A linear actuator (not shown, but constructed, for example, as an electric spindle drive flanged onto cover 5 of base 2) acts on thrust tube 19.

A rotary drive acts on annular die 8, causing its rotation around press axis X. This comprises a rotary actuator (not shown, but constructed, for example, as an electric motor flanged onto shell portion 4 of base 2) and a drive belt 22 coupling this with annular die 8, wherein shell portion 4 of base 2 has an opening (not shown) for drive belt 22. This drive belt 22 wraps around annular die 8 between the first rolling bearing 6—which provides radial bracing for annular die 8 and is constructed as a ball bearing 23—and second rolling bearing 7—which provides axial/radial bracing for the annular die 8 and constructed as a tapered roller bearing 24. This inner ring 25 of second roller bearing 7 is disposed on an annular projection 27—surrounding a central opening 26 of base 2 extending around press axis X—of bottom 3 of base 2.

Figure 2:
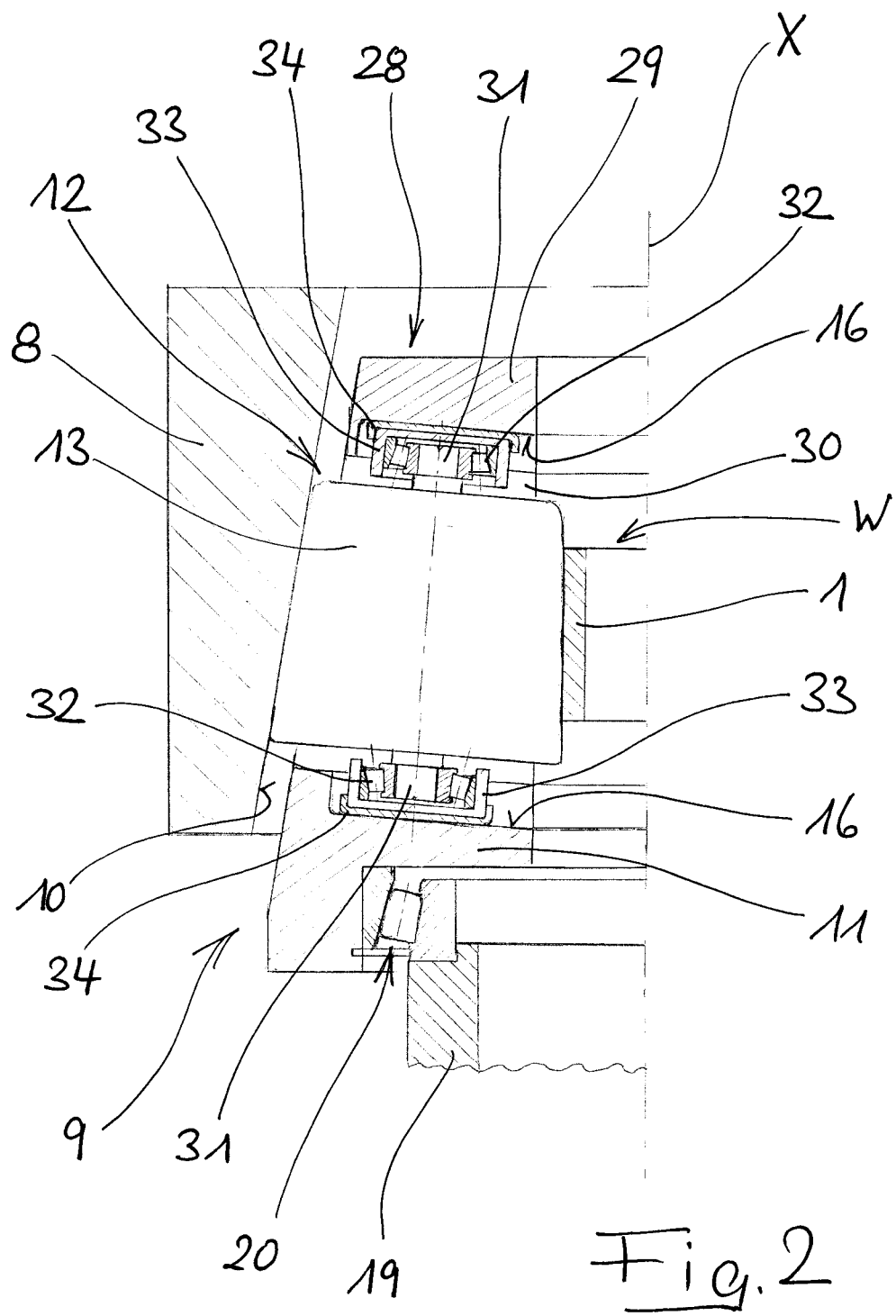
FIG. 2 shows a section through a radial press according to a second exemplary embodiment of the invention; furthermore

FIG. 2 illustrates, within the scope of the section relevant in this respect, an embodiment having rolling-element unit 9 modified compared with FIG. 1. And, in this particular case, thrust ring 11 is part of a rolling-element cage 28, which has an annular wall 29 provided with a number of openings 30 corresponding to the number of rolling elements 12. A rolling element 12 is rotatably mounted at its two ends in each of the openings 30. For this purpose, rolling element 12—which again is substantially frustoconical—respectively has at its end respectively a journal 31, which engages in the inner ring of a tapered roller bearing 32, the outer ring of which is received in a bearing cup 33. An exchangeable cup-shaped sliding bearing plate 34, which respectively slides on a sliding face 16 bounding the associated opening 30 of the rolling-element cage 28, is mounted on this. This cup-shaped sliding bearing plate 34 is respectively matched in such a way in its dimensioning to the dimensions of opening 30 that the displacement taking place along sliding faces 16 takes place in the direction of press axis X and laterally away from this, i.e. is guided in circumferential direction.

Since all further aspects of the exemplary embodiment according to FIG. 2 are obvious to a person skilled in the art from the foregoing explanation of the first exemplary embodiment illustrated in FIG. 1, reference is made to the latter in order to avoid repetitions. It is to be emphasized, however, that FIG. 2, just as FIG. 1, makes it quite evident that, despite an equilibrium of the forces acting on the rolling cones as a result of the relative osculation of rolling cones 13 to the (concave) inner contour 10 of annular die 8, a significantly lower pressure per unit area exists in the respective contact region in question than in the respective contact region of the rolling cone 13 in question against the (convex) outer contour of workpiece W. In other words, a correspondingly increased radial pressure—compared to the pressure existing between annular die 8 and rolling cone 13—and thus correspondingly high forming action are obtained precisely due to the geometric conditions at workpiece W. Just as the contact zones of rolling cones 13 on annular die 8, the contact zones of rolling cones 13 on workpiece W then typically also taper slightly in the direction of the tip of rolling cones 13, and thus can be used technically if necessary for increasing pressure in this direction.

Figure 3:
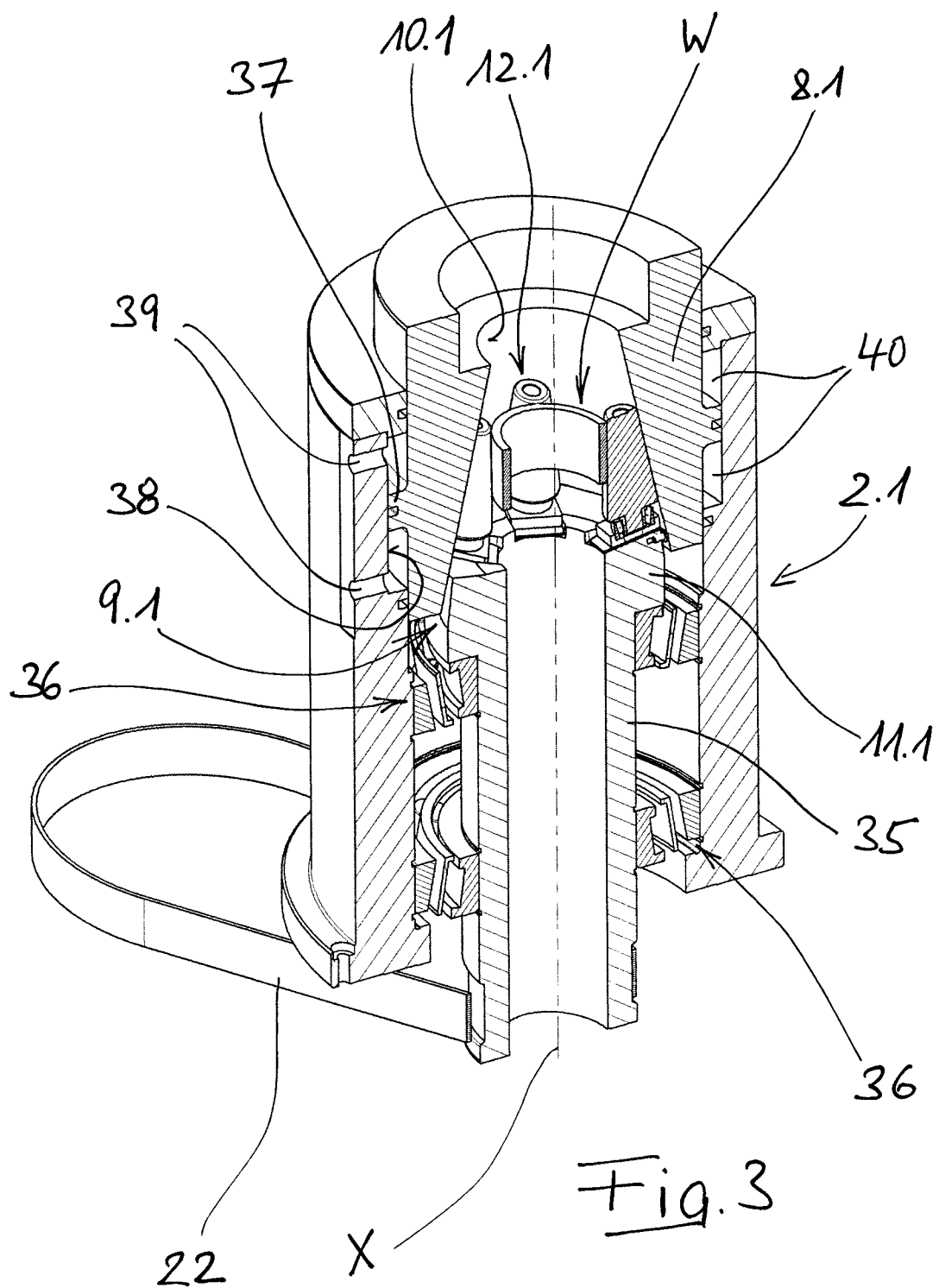
FIG. 3 illustrates an implementation of the invention in modified form.

According to FIG. 3, in a modification of the exemplary embodiments of the invention illustrated in FIGS. 1 and 2, it is not annular die 8.1 on which the rotary drive acts, but to the contrary on rolling-element unit 9.1. In this respect, drive belt 22 in this case wraps around a sleeve 35, which is formed onto thrust ring 11.1 of rolling-element unit 9.1 and which also serves—in a manner taking place via two rolling bearings 36—as the bearing of rolling-element unit 9.1, which is rotatable relative to press axis X. Conversely, again in a modification of the exemplary embodiments of the invention illustrated in FIGS. 1 and 2, the feed drive acts in this case not on rolling-element unit 9.1 but to the contrary on annular die 8.1. In a specific exemplary embodiment, the feed drive in this case is constructed hydraulically, in that an annular collar 37 provided on annular die 8.1 at its outer circumference is guided sealingly in a cylindrical bore 38 of base 2.1 and divides this into two oppositely operating hydraulic working chambers 40, which can be respectively pressurized via a fluid port 39. In this respect, annular die 8.1 in this specific configuration is not designed for rotation around press axis X, with the result that workpiece W—under the action of rolling elements 12.1 rolling on it and on inner contour 10.1 of annular die 8.1—rotates. It is obvious, however, that, in order to avoid rotation of workpiece W, rotation of annular die 8.1 around press axis X could be realized without difficulty, for example, in that (see FIG. 5) annular die 8.1 is received rotatably in a bearing sleeve, which in turn is received in base 2.1—in a manner adjustable by means of the feed drive—along press axis X.

Since all further aspects of the radial press according to FIG. 3 are obvious to a person skilled in the art from the foregoing explanation of the exemplary embodiments illustrated in FIGS. 1 and 2, reference is made to the latter in order to avoid repetitions.

Figure 4:
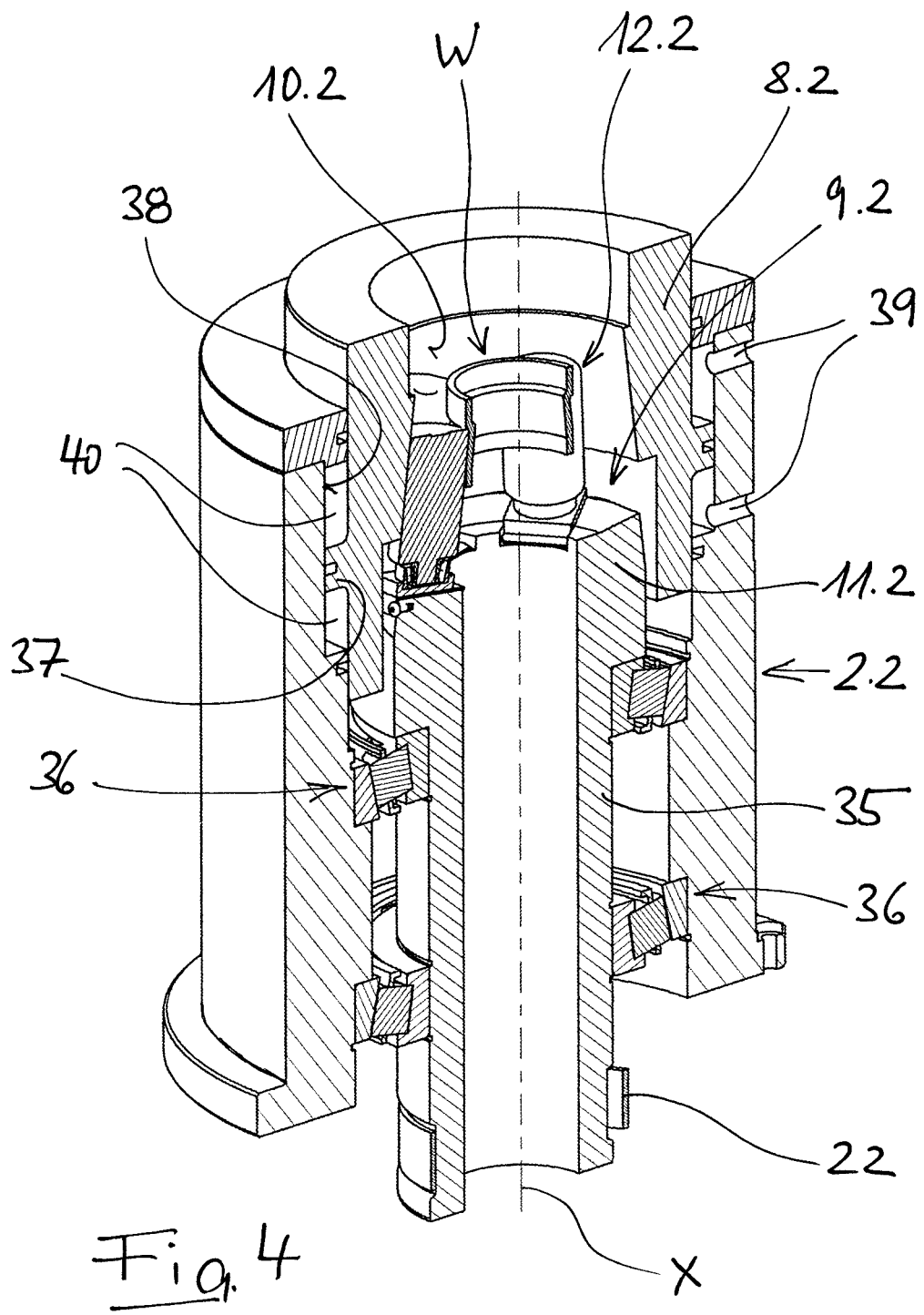
FIG. 4 illustrates another implementation of the invention in modified form.

In essence, the modification illustrated in FIG. 4 differs from that according to FIG. 3 solely by the shape of rolling elements 12.2. This is because these are cylindrical in this case. In this way, the radially deformed workpiece W takes on, in the forming zone, not a cylindrical but to the contrary a conical configuration, corresponding to conical inner contour 10.2 of annular die 8.2. Incidentally, especially with regard to the other aspects of rolling-element unit 9.2 together with thrust ring 11.2 and those of base 2.2, reference is made to the foregoing explanations of FIGS. 1-3.

Figure 5:
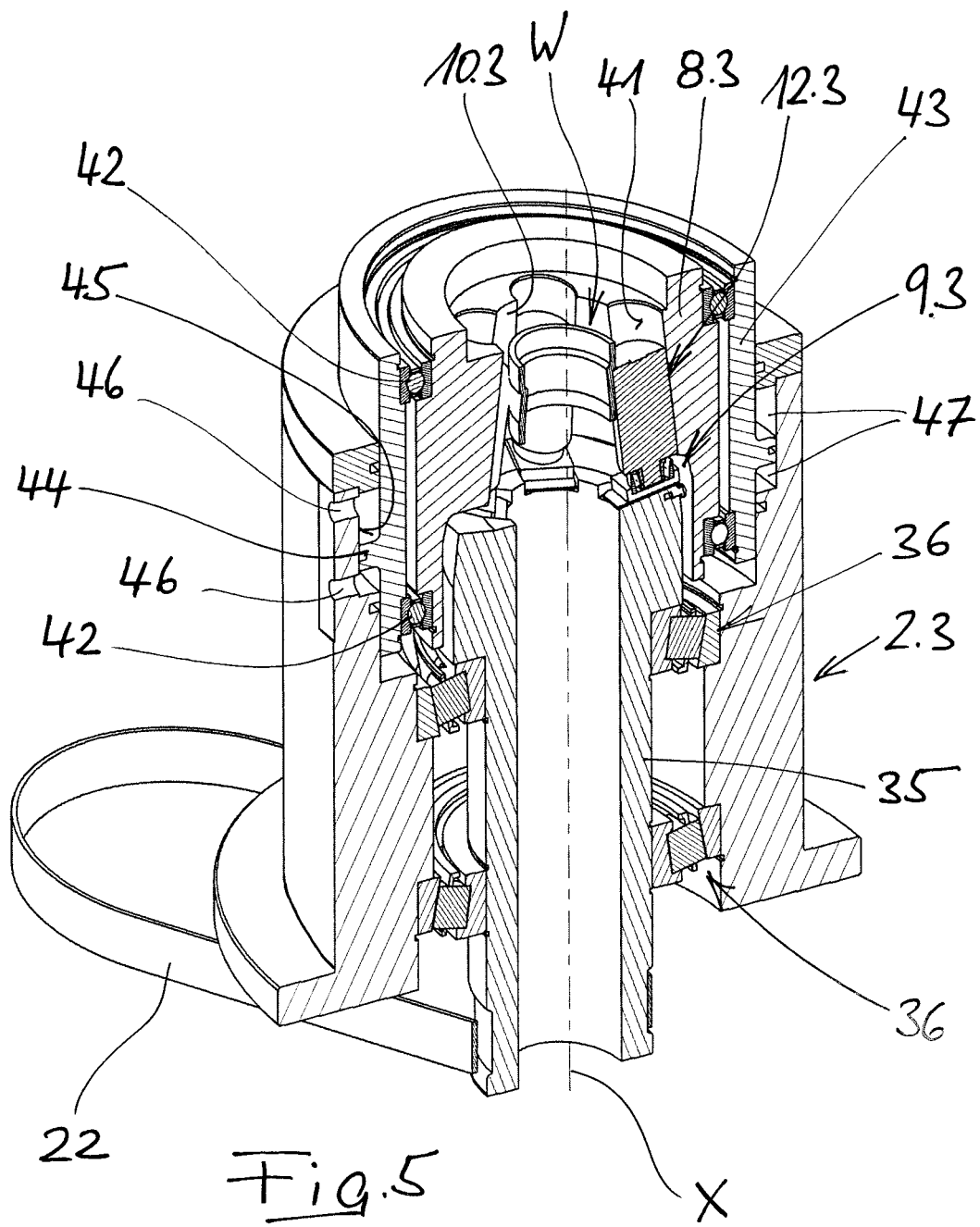
FIG. 5 illustrates yet another implementation of the invention in modified form.

The modification illustrated in FIG. 5 is conceptually similar to that shown in FIG. 4. The decisive differences relate to annular die 8.3, and specifically as follows: Inner contour 10.3 of annular die 8.3 is not rotationally symmetrical here; to the contrary, it has, disposed uniformly around press axis X and inclined relative to press axis X, pocket-shaped receptacles 41 for rolling elements 12.3. Thus rolling elements 12.3—again cylindrical—do not roll on inner contour 10.3 of annular die 8.3, but instead they rotate respectively around their own axis in the associated receptacle 41, the inner face of which corresponds for this purpose to a cylinder segment partly enclosing the associated rolling element 12.3. Annular die 8.3 is rotatably received—via two rolling bearings 42—in a bearing sleeve 43, which in turn is received in base 2.3, in a manner displaceable along press axis X. By way of example, the feed drive in turn is constructed hydraulically, in that an annular collar 44 provided on bearing sleeve 43 at its outer circumference is guided sealingly in a cylindrical bore 45 of base 2.3 and divides this into two oppositely operating hydraulic working chambers 47, which can be pressurized respectively via a fluid port 46. It is obvious, however, that an electric feed drive (for example via an electric spindle drive) could also be realized without difficulty, as already in the case of the radial presses according to FIGS. 3 and 4. This radial press, in which rolling-element unit 9.3 and annular die 8.3 recognizably rotate around press axis X in the same direction of rotation and the same rpm, obviously presupposes that workpiece W is held in a retainer, thus preventing it from rotation around press axis X.

Figure 6:
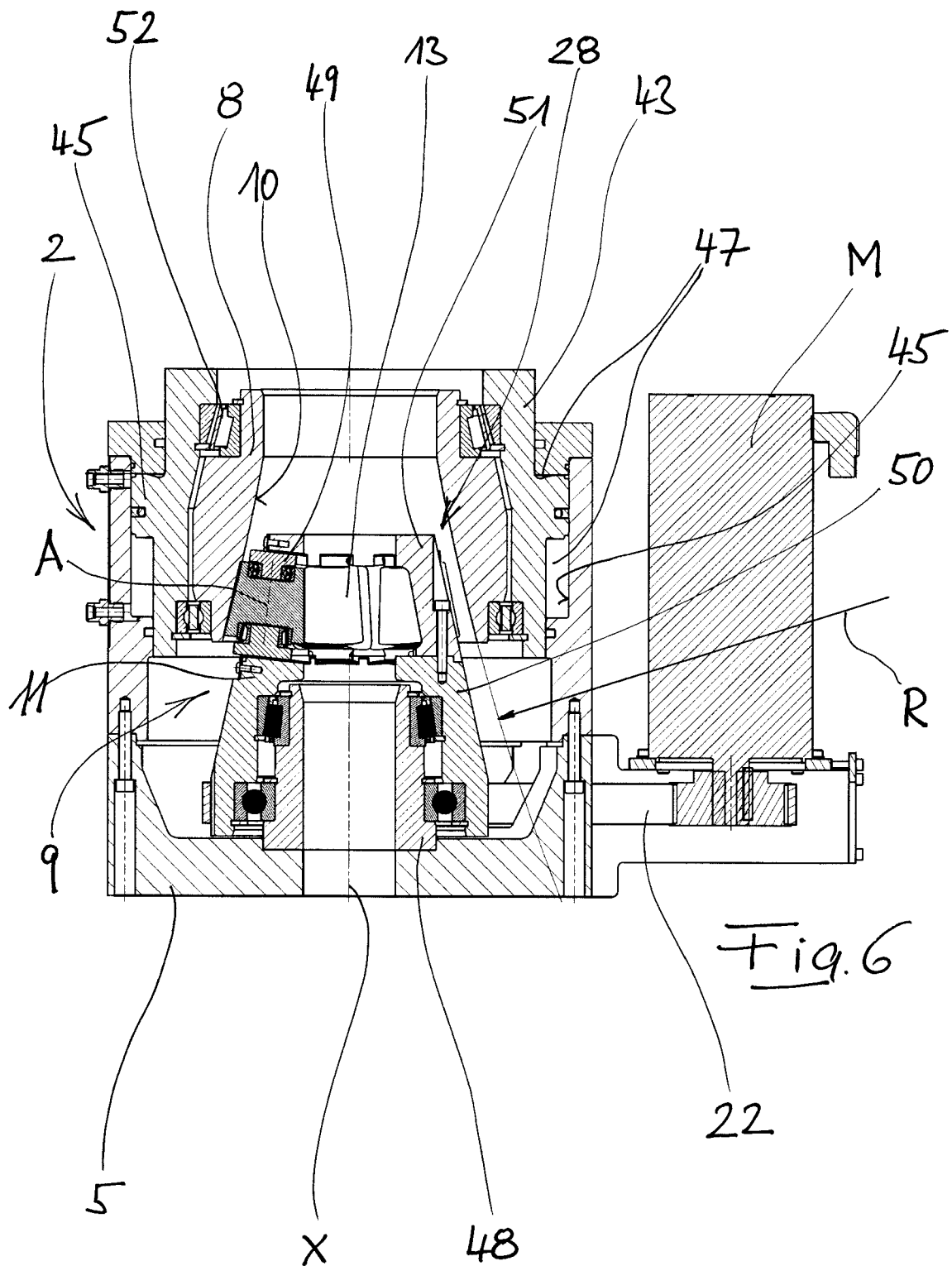
FIG. 6 illustrates yet another preferred embodiment of the invention.
Figure 7:
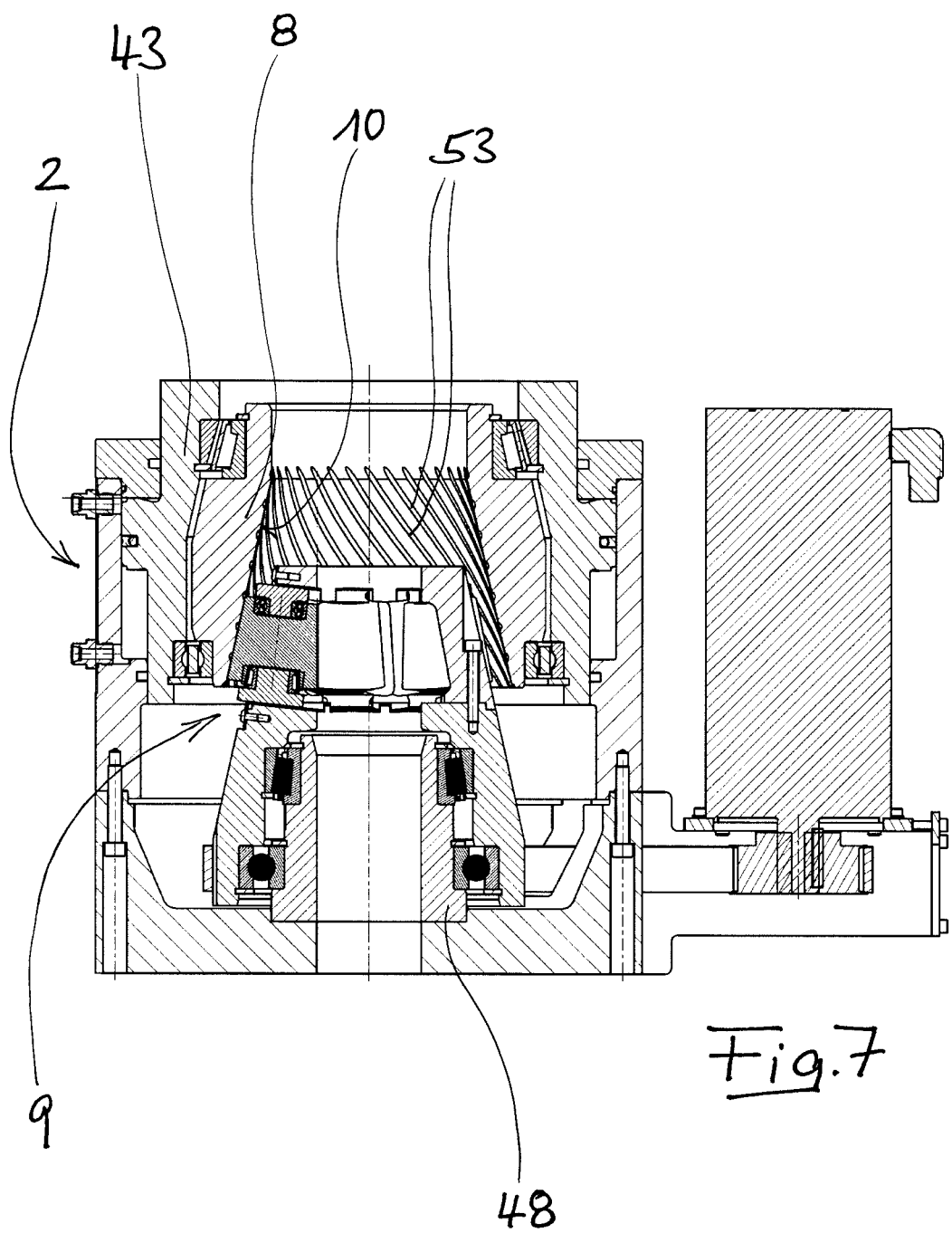
FIG. 7 illustrates yet another embodiment of the invention.

The two modified embodiments according to FIGS. 6 and 7, wherein the workpieces to be formed may typically be fixed to be co-positioned and co-rotated relative to base 2 (which again is housing-like) during its use as intended, are obvious to a person skilled in the art from the foregoing detailed explanations of the other exemplary embodiments. Unnecessary repetitions concerning the mode of operation of the radial press and the function of the individual components are omitted. However, attention is directed explicitly to the bearing, which is rotatable and absorbs radial and axial forces, of rolling body unit 9—which, by means of a belt drive (see drive belt 22), can be rotated around press axis X by motor M—on a hollow journal 48 mounted on lower cover 5 of base 2. Part of this rolling-element unit 9 is—corresponding to the concept illustrated in FIG. 2—a rolling-element cage 28 having openings. Therein, the two bearing pieces 49—respectively on associated sliding guides—on which the respectively associated rolling cone 13 is mounted with the ability to rotate around its axis A, are mounted in a manner displaceable toward press axis X and away from it. The two-part structure of rolling-element cage 28 comprising a lower part 50 and an upper part 51 fixed thereon is clearly recognizable, wherein the end of lower part 50 equipped with sliding guides functions as a thrust ring 11.

At this point, it is to be emphasized that the illustrated construction of the drive with an (external) motor, which is coupled to the driven part via a belt drive, represents only one conceivable configuration. Other drive concepts come into consideration in the same way. One conceivable example is an (integrated) hollow-shaft drive by means of a torque motor, the output of which is directly coupled with the thrust ring or the annular die. A direct rotary drive of the rolling elements is also conceivable.

Annular die 8 is—corresponding to the concept illustrated in FIG. 5—mounted in freely rotatable manner around press axis X in a hollow-piston-type bearing sleeve 43 which, in order to bring about radial positioning of rolling cones 13, is axially adjustable by means of corresponding pressurization of the two hydraulic working chambers 47 in cylindrical bore 45 of base 2. The bracing of the outer and inner ring of the (upper) bearing—constructed as a tapered roller bearing 52—of annular die 8 by means of diagonally acting shoulders on bearing sleeve 43 as well as annular die 8 then permits the transmission of particularly large axial forces from bearing sleeve 43 to annular die 8. The same applies for the bearing—which is similarly axially loaded—of rolling-element unit 9 on hollow journal 48.

In this connection, yet another two additional constructive features are illustrated in FIGS. 6 and 7. According to FIG. 6, inner contour 10 of annular die 8 is not mathematically exactly frustoconical but to the contrary (see radius R) is slightly convex. And, according to FIG. 7, inner contour 10 of annular die 8 has spirally or helically arranged grooves 53, serving for removal of abraded material, soiling or the like.

Figure 8:
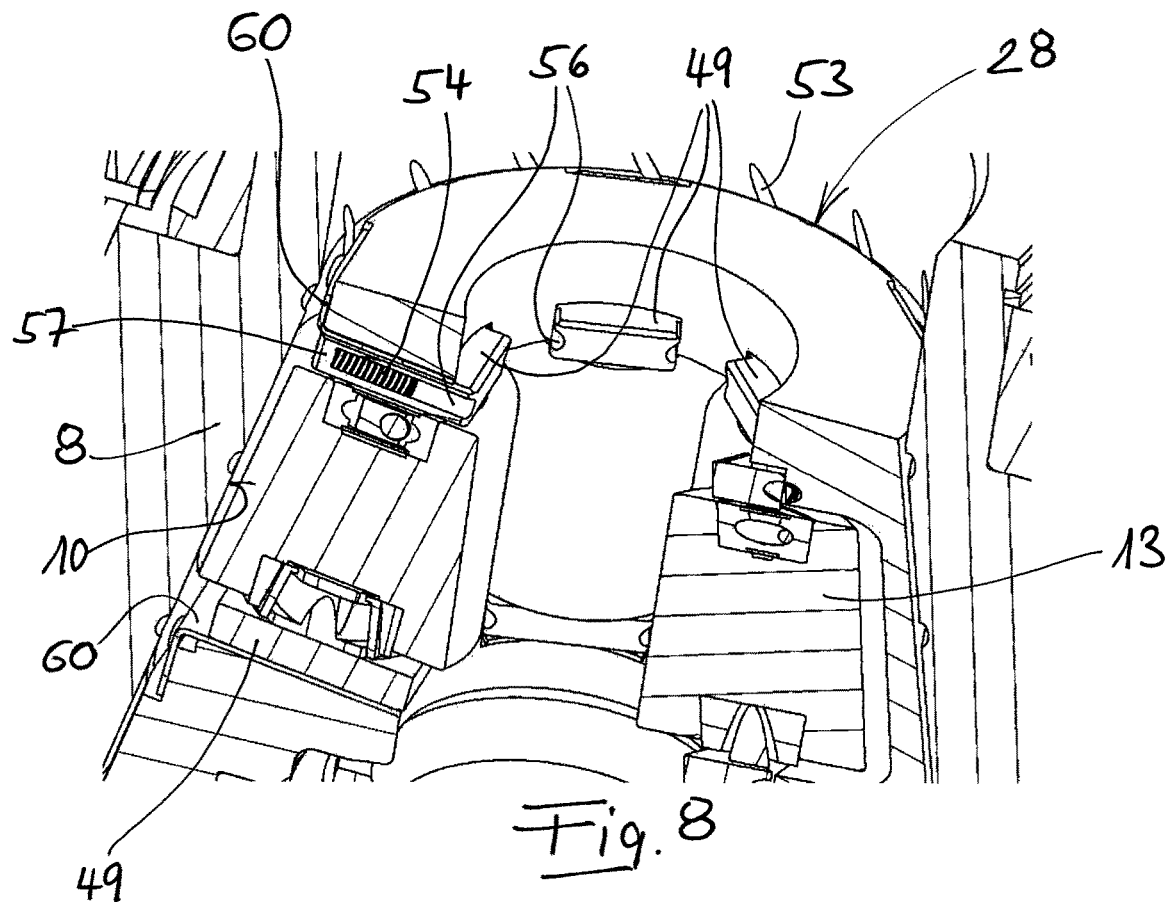
FIG. 8 illustrates a partial region of the radial press according to FIG. 7 in enlarged representation and FIG. 8a illustrates a detail of FIG. 8 in section.
Figure 8A:
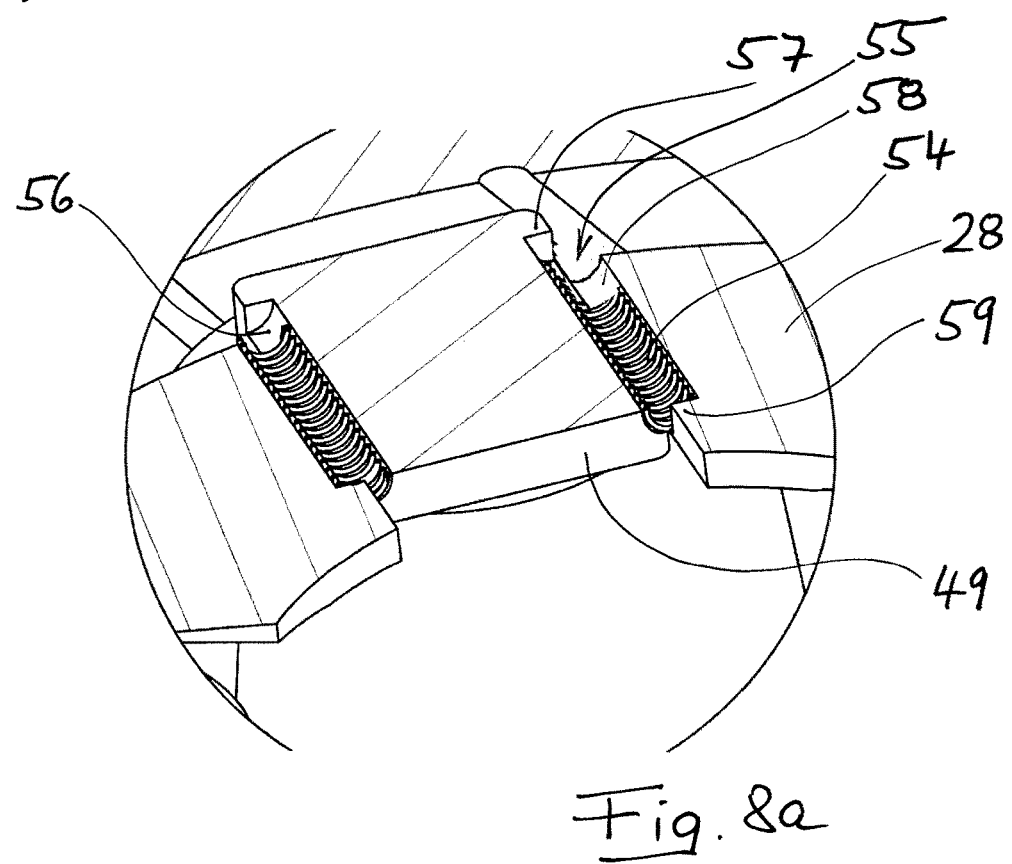

In FIGS. 8 and 8*a*, which show an enlarged view of a partial region of the radial press according to FIG. 7, the guidance of rolling cones 13 in rolling-element cage 28 is particularly clearly apparent. The sliding bearing of bearing pieces 49 on sliding bearing plates 60 is apparent. Likewise, it is illustrated how the bearing pieces are respectively preloaded radially outwardly by means of two restoring springs 54 in the form of helical compression springs, so that rolling cones 13 bear constantly on inner contour 10 of annular die 8. These restoring springs 54—shown only partly in FIG. 8*a* for reasons of illustration—are received in cavities 55, which have approximately cylindrical configuration and are defined by respectively two half cylinders. Therein a first half-cylinder 56 is constructed laterally on the respective bearing piece 49 and is bounded radially on the outside by a bottom 57; the other corresponding half-cylinder 58 is constructed on rolling bearing cage 28 and is bounded radially on the inside by a bottom 59. In this way, restoring spring 54 received in the respective cavity 55 is braced on the one hand on bottom 57 of half cylinder 56 in question and on the other hand on bottom 59 of the corresponding half cylinder 58. Incidentally, the details of FIGS. 8 and 8*a* are obvious to a person skilled in the art from the foregoing explanations of the other figures.

What is claimed is:

1. A radial press, comprising
   a base (2),
   a hollow annular die (8) mounted rotatably thereon relative to a press axis (X) and having an inner contour (10) that tapers in the direction of the press axis (X) and is rotationally symmetrical relative to the press axis (X) and
   a rolling-element unit (9) capable of rotating relative to the press axis (X) and having a thrust ring (11) surrounding the press axis (X) and a plurality of rotationally symmetric rolling elements (12), which are disposed around the press axis (X) and taper at least in regions, which are rotatably axially braced on the thrust ring (11) with variable distance to the press axis (X), and which can roll along the inner contour (10) of the annular die (8),
   wherein a rotary drive acts on the annular die (8) and/or on the rolling-element unit (9), causing their rotation around the press axis (X), and wherein furthermore a feed drive acts on the rolling-element unit (9) and/or on the annular die (8), causing axial adjustment of the rolling-element unit (9) and of the annular die (8) relative to one another along the press axis.

2. The radial press of claim 1, wherein the inner contour (10) of the annular die (8) and the rolling elements (12) have a substantially frustoconical basic shape.

3. The radial press of claim 2, wherein twice the cone angle of the rolling elements (12) corresponds substantially to half the cone angle of the inner contour (10) of the annular die (8).

4. The radial press of claim 2, wherein the inner contour (10) of the annular die (8) and the rolling elements (12) are constructed in geometrically exactly frustoconical manner.

5. The radial press of claim 2, wherein the rolling elements (12) are made slightly convex, especially in that their cone angle varies continuously over its extent along their own axis.

6. The radial press of claim 1, wherein the rolling elements (12) are mounted with the ability to rotate on bearing pieces (15), which are displaceably guided along the thrust ring (11) on sliding faces (16).

7. The radial press of claim 6, wherein the sliding faces (16) are respectively constructed by the surface of an exchangeable sliding-bearing plate (18).

8. The radial press of claim 6, wherein the sliding faces (16) are inclined relative to the press axis (X).

9. The radial press of claim 6, wherein the bearing pieces (15) are guided in undercut guides (17) of the thrust ring (11) in such a manner that they cannot be lifted out.

10. The radial press of claim 1, wherein the base (2) is constructed in the form of a housing, wherein a shell portion (4) of the base surrounds the annular die (8) at least partly.

11. The radial press of claim 1, wherein the feed drive comprises a thrust tube (19) coaxial with the press axis (X).

12. The radial press of claim 11, wherein, on the base, the thrust tube (19) is guided displaceably along the press axis (X) via a linear guide (21).

13. The radial press of claim 1, wherein an odd number of rolling elements (12) is provided.

14. The radial press of claim 1, wherein the rolling-element unit (9) has preloading springs, which preload the rolling elements (12) outwardly for bearing on the inner contour (10) of the annular die (8).

15. The radial press of claim 1, wherein the surface of the rolling elements (12) is profiled.

16. The radial press of claim 15, wherein a helical profiling is provided.

17. The radial press of claim 15, wherein the rolling elements (12) have a nubbed surface.

18. The radial press of claim 15, wherein the rolling elements (12) have annularly closed micro-serration extending over the respective circumference.

19. The radial press of claim 1, wherein the rotary drive acts exclusively on the annular die (8).

20. The radial press of claim 1, wherein the feed drive acts exclusively on the rolling-element unit (9).

21. The radial press of claim 1, wherein the bearing of the annular die (8) on the base (2) comprises two spatially separated bearings (6, 7), wherein the point of application of the rotary drive on the annular die (8) is located between the two bearings (6, 7).

22. The radial press of claim 1, wherein the base (2) has, adjacent to the end of the annular die (8) associated with the smaller diameter of the inner contour (10), an opening (26) extending around the press axis (X).

23. The radial press of claim 1, wherein the annular die is constructed in several parts in such a way that it comprises a support ring and an insert, which is received exchangeably therein and defines the inner contour.

24. The radial press of claim 1, wherein the thrust ring (11) is part of a rolling-element cage (28), which is provided with a wall (29) having openings (30), in which the rolling elements (12) are rotatably mounted at their two ends.

25. The radial press of claim 1, wherein substantially cylindrical rolling elements (12.2, 12.3) or rolling elements that widen at least in some regions are used instead of rolling elements (12) that taper at least in some regions.

26. The radial press of claim 1, wherein the annular die (8.1; 8.2) is not rotatable relative to the press axis (X) but to the contrary is co-rotatable with the base (2.1; 2.2).

27. The radial press of claim 1, wherein the inner contour (10.3), tapering in the direction of the press axis (X'), of the annular die (8.3) is not rotationally symmetrical, but to the contrary has a plurality, disposed uniformly around the press axis (X) and inclined relative to the press axis (X), of pocket-shaped receptacles (41) for the rolling elements (12.3), wherein the rolling elements (12.3), which are rotationally symmetrical but do not necessarily taper in some regions, for their part roll not on the inner contour (10.3) of the annular die (8.3), but to the contrary are respectively mounted rotatably around their own axis and in slidingly displaceable manner in the associated pocket-shaped receptacle (41), along the axis of the latter.

\* \* \* \* \*